(12) United States Patent
Murata et al.

(10) Patent No.: US 10,164,446 B2
(45) Date of Patent: Dec. 25, 2018

(54) DISCHARGE CIRCUIT MALFUNCTION DIAGNOSIS DEVICE AND DISCHARGE CIRCUIT MALFUNCTION DIAGNOSIS METHOD

(71) Applicant: Mitsubishi Electric Corporation, Tokyo (JP)

(72) Inventors: Yasukazu Murata, Hyogo (JP); Masami Nakashima, Hyogo (JP); Shingo Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 14/917,412

(22) PCT Filed: Oct. 29, 2013

(86) PCT No.: PCT/JP2013/079259
§ 371 (c)(1),
(2) Date: Mar. 8, 2016

(87) PCT Pub. No.: WO2015/063860
PCT Pub. Date: May 7, 2015

(65) Prior Publication Data
US 2016/0226273 A1    Aug. 4, 2016

(51) Int. Cl.
*H02J 7/00*    (2006.01)
(52) U.S. Cl.
CPC .......... *H02J 7/0026* (2013.01); *H02J 7/0016* (2013.01); *H02J 7/0021* (2013.01)
(58) Field of Classification Search
CPC ....... H02J 7/0026; H02J 7/0021; H02J 7/0016
See application file for complete search history.

(56) References Cited

U.S. PATENT DOCUMENTS

| | | | |
|---|---|---|---|
| 8,791,667 B2 * | 7/2014 | Kain | H01M 10/441 320/116 |
| 2004/0036446 A1 * | 2/2004 | Iwashima | G01R 31/3658 320/116 |

(Continued)

FOREIGN PATENT DOCUMENTS

| | | |
|---|---|---|
| EP | 2 632 021 A1 | 8/2013 |
| JP | 2004-266992 A | 9/2004 |

(Continued)

OTHER PUBLICATIONS

International Search Report for PCT/JP2013/079259 dated Dec. 10, 2013.

*Primary Examiner* — Nha Nguyen
(74) *Attorney, Agent, or Firm* — Sughrue Mion, PLLC; Richard C. Turner

(57) ABSTRACT

The discharge circuit malfunction diagnosis device configured to diagnose a malfunction of a discharge circuit, which is to be applied to a power supply system including: an assembled battery including a plurality of cells; a discharge circuit which is configured to discharge the each of the plurality of cells when driven; and a voltage adjustment section configured to determine, based on voltages of the respective plurality of cells of the assembled battery, a target cell voltage and a cell to be discharged, and configured to drive a discharge circuit for the cell to be discharged in accordance with the target cell voltage, includes a malfunction diagnosis section configured to compare a discharge circuit pre-driving voltage and a discharge circuit post-driving voltage of the cell to be discharged, to thereby diagnose a malfunction of a discharge circuit corresponding to the cell to be discharged.

9 Claims, 10 Drawing Sheets

(56) References Cited

U.S. PATENT DOCUMENTS

| | | | |
|---|---|---|---|
| 2004/0155629 A1 | 8/2004 | Kobayashi et al. | |
| 2004/0196007 A1* | 10/2004 | Iwashima | H02J 7/0021 320/134 |
| 2008/0103707 A1* | 5/2008 | Iwasaki | H02J 7/0021 702/58 |
| 2011/0003182 A1* | 1/2011 | Zhu | H01M 10/482 429/50 |
| 2011/0109275 A1* | 5/2011 | Taniguchi | H01M 10/44 320/145 |
| 2011/0267009 A1* | 11/2011 | Nakatsuji | H01M 2/34 320/152 |
| 2012/0194134 A1* | 8/2012 | Kain | H01M 10/441 320/116 |
| 2012/0306436 A1* | 12/2012 | Nakamura | G01R 31/3624 320/107 |
| 2013/0057198 A1* | 3/2013 | Gerlovin | H02J 7/0019 320/103 |
| 2013/0084513 A1* | 4/2013 | Quan | H02M 3/1582 429/431 |
| 2013/0234504 A1* | 9/2013 | Morita | H01M 10/425 307/9.1 |
| 2013/0242446 A1* | 9/2013 | Oshima | H02H 3/207 361/86 |
| 2015/0008885 A1* | 1/2015 | Yoshida | H01M 10/425 320/134 |

FOREIGN PATENT DOCUMENTS

| | | |
|---|---|---|
| JP | 2010-117235 A | 5/2010 |
| JP | 2011-78275 A | 4/2011 |
| JP | 2012-90474 A | 5/2012 |

* cited by examiner

DISCHARGE CIRCUIT MALFUNCTION DIAGNOSIS DEVICE AND DISCHARGE CIRCUIT MALFUNCTION DIAGNOSIS METHOD

CROSS REFERENCE TO RELATED APPLICATIONS

This application is a National Stage of International Application No. PCT/JP2013/079259 filed Oct. 29, 2013, the contents of all of which is incorporated herein by reference in its entirety.

TECHNICAL FIELD

The present invention relates to a discharge circuit malfunction diagnosis device and a discharge circuit malfunction diagnosis method for diagnosing a malfunction of a discharge circuit, which are applicable to a power supply system including an assembled battery formed of an assembly of a plurality of power storage elements (hereinafter also referred to as "cells") connected in series, which is used as, for example, a battery for an electric vehicle or the like, and discharge circuits configured to discharge the power storage elements.

BACKGROUND ART

Development has hitherto been made on a technology for an assembled battery that is aimed at increasing an amount of power that can be stored in the assembled battery and reducing loss during charge and discharge by combining power storage elements in series.

In order to eliminate a voltage variation among individual power storage elements caused by an individual variation of the power storage elements when the power storage elements are connected in series to supply electric power to a vehicle, it is necessary for the assembled battery that the power storage element be provided with a discharge circuit (cell balancer) and the discharge circuit be driven intermittently during a stop of the vehicle to maintain a voltage balance of the power storage elements.

When a malfunction occurs in a discharge switch or a voltage drop element included in the discharge circuit, however, there is a problem in that a voltage balance among the power storage elements is lost and a power storage element is overcharged or overdischarged.

To deal with this problem, there is proposed an assembled battery discharge device, including a discharge circuit, which is formed of one or more voltage drop elements and a discharge switch connected in series, and which is configured to discharge each secondary battery (cell) serving as a battery constructing an assembled battery, to thereby reduce a voltage variation among the secondary batteries of the assembled battery, a voltage detection circuit configured to detect a terminal voltage of the secondary battery via the voltage drop element and not detecting the voltage of the secondary battery without the voltage drop element, and a discharge circuit malfunction determination section configured to determine a malfunction of the discharge circuit based on a difference between the terminal voltage generated when the discharge switch is turned on and the terminal voltage generated when the discharge switch is turned off, which are detected in time sequence, or based on a magnitude relationship of a ratio therebetween (see, for example, Patent Literature 1).

In this assembled battery discharge device, the discharge circuit malfunction determination section determines a malfunction of the discharge circuit based on the difference between the terminal voltage generated when the discharge switch is turned on and the terminal voltage generated when the discharge switch is turned off, which are detected in time sequence, or based on the magnitude relationship of the ratio therebetween. Thus, a malfunction of the discharge circuit can be detected with a simple configuration.

CITATION LIST

Patent Literature

[PTL 1] JP 4035777 B2

SUMMARY OF INVENTION

Technical Problem

The related art, however, has the following problems.

In the related-art assembled battery discharge device disclosed in Patent Literature 1, the discharge circuit malfunction determination section determines a malfunction of the discharge circuit in time sequence. Accordingly, if the terminal voltage of the cell generated when the discharge switch is turned on is low, the terminal voltage differs by a small amount between when the discharge switch is turned on and when the discharge switch is turned off, resulting in a fear of an erroneous malfunction determination.

In view of the above, in Patent Literature 1, there is disclosed a method involving discriminating whether each cell is a normal cell or an abnormal cell, calculating an average value of voltages of the normal cells, and setting a threshold used for a malfunction determination to be a value lower than the average value by a predetermined given value, thereby improving determination accuracy.

This case, however, requires processing of discriminating between a normal cell and an abnormal cell, resulting in a problem in that the processing is complicated to increase the cost. There is also a problem in that a margin cannot be provided for threshold setting because the original cell voltage (when the discharge switch is on) is low.

The present invention has been made in order to solve the problems as described above, and it is an object thereof to provide a discharge circuit malfunction diagnosis device and a discharge circuit malfunction diagnosis method that are capable of preventing an erroneous malfunction determination and require no increase in cost.

Solution to Problem

According to one embodiment of the present invention, there is provided a discharge circuit malfunction diagnosis device configured to diagnose a malfunction of a discharge circuit, which is to be applied to a power supply system, the power supply system including: an assembled battery including a plurality of cells; a discharge circuit, which is provided correspondingly to each of the plurality of cells, and which is configured to discharge the each of the plurality of cells when driven; and a voltage adjustment section configured to determine, based on voltages of the respective plurality of cells of the assembled battery, a target cell voltage configured to reduce a voltage variation among the respective plurality of cells of the assembled battery, and a cell to be discharged, and configured to drive a discharge circuit for the cell to be discharged in accordance with the target cell voltage, the discharge circuit malfunction diagnosis device including a malfunction diagnosis section configured to compare a discharge circuit pre-driving voltage and a discharge circuit post-driving voltage of the cell to be discharged, to thereby diagnose a malfunction of a discharge circuit corresponding to the cell to be discharged.

According to one embodiment of the present invention, there is provided a discharge circuit malfunction diagnosis method for diagnosing a malfunction of a discharge circuit, which is to be applied to a power supply system, the power supply system including: an assembled battery including a plurality of cells; a discharge circuit, which is provided correspondingly to each of the plurality of cells, and which is configured to discharge the each of the plurality of cells when driven; and a voltage adjustment section configured to determine, based on voltages of the respective plurality of cells of the assembled battery, a target cell voltage configured to reduce a voltage variation among the respective plurality of cells of the assembled battery, and a cell to be discharged, and configured to drive a discharge circuit for the cell to be discharged in accordance with the target cell voltage, the discharge circuit malfunction diagnosis method including a malfunction diagnosis step of comparing a discharge circuit pre-driving voltage and a discharge circuit post-driving voltage of the cell to be discharged, to thereby diagnose a malfunction of a discharge circuit corresponding to the cell to be discharged.

Advantageous Effects of Invention

According to the discharge circuit malfunction diagnosis device and the discharge circuit malfunction diagnosis method of the embodiments of the present invention, the malfunction diagnosis section (step) is configured to compare a discharge circuit pre-driving voltage and a discharge circuit post-driving voltage of a cell to be discharged, to thereby diagnose a malfunction of a discharge circuit corresponding to the cell to be discharged.

With this, a malfunction is diagnosed for a cell for which the discharge circuit is driven, and hence an erroneous malfunction determination due to a small difference between the discharge circuit pre-driving voltage and the discharge circuit post-driving voltage is not caused. Further, an existing discharge circuit may be used without providing any special circuit.

Therefore, there may be obtained a discharge circuit malfunction diagnosis device and a discharge circuit malfunction diagnosis method that are capable of preventing an erroneous malfunction determination and require no increase in cost.

DESCRIPTION OF EMBODIMENTS

Figure 1:
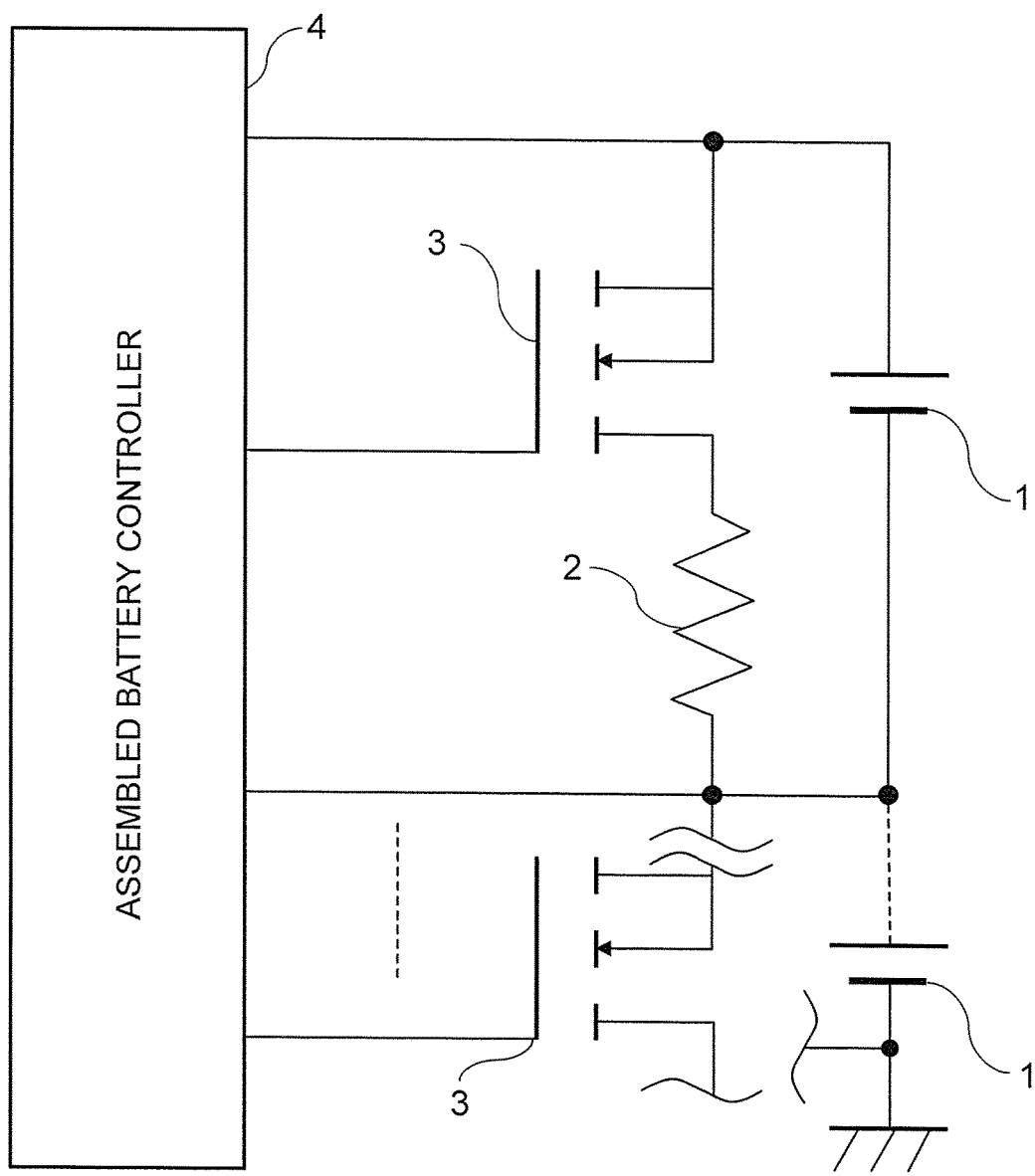
FIG. 1 is a configuration diagram illustrative of a power supply system applied with a discharge circuit malfunction diagnosis device according to a first embodiment of the present invention.

Now, a discharge circuit malfunction diagnosis device and a discharge circuit malfunction diagnosis method according to exemplary embodiments of the present invention are described with reference to the drawings. In the drawings, like reference symbols denote like or corresponding parts for description.

First Embodiment

FIG. 1 is a configuration diagram illustrative of a power supply system applied with a discharge circuit malfunction diagnosis device according to a first embodiment of the present invention. Referring to FIG. 1, the power supply system includes cells (power storage elements, secondary batteries) 1, discharge resistors 2, metal-oxide-semiconductor field-effect transistors (MOSFETs) 3, and an assembled battery controller 4.

The cell 1 is a base unit of an assembled battery. The assembled battery is formed of the plurality of cells 1 connected in series. The discharge resistor 2 is connected for each cell 1, and discharges the cell 1. The MOSFET 3 is connected for each cell 1, and is turned on when the discharge resistor 2 discharges the cell 1. Note that, the MOSFET 3 is normally off, and is turned on in order to drive a discharge circuit.

The assembled battery controller 4 manages the assembled battery. In the first embodiment, the assembled battery controller 4 is configured to manage the whole assembled battery formed of the plurality of cells 1, but may be a cell controller configured to manage each cell 1. The discharge resistor 2, the MOSFET 3, and the assembled battery controller 4 form a discharge circuit.

The assembled battery controller 4 monitors a voltage of each cell 1 to notify an electronic control unit (ECU) (not shown) or the like of the voltage. The assembled battery controller 4 has the function of turning on the MOSFET 3 for each cell 1 in response to a discharge circuit driving request that is output from the ECU or the like, and turning off the MOSFET 3 for each cell 1 when the voltage of each cell 1 reaches a discharge circuit driving target cell voltage.

In the first embodiment, the discharge circuits for the plurality of cells 1 can be driven (MOSFETs 3 can be turned on) simultaneously, and the driving of the discharge circuits for the plurality of cells 1 can be stopped (MOSFETs 3 can be turned off) at individually different timings.

Specifically, for example, a voltage step-down of discharging the first cell 1 from 5 V to 3 V and the second cell 1 from 4 V to 3 V is considered. First, the MOSFET 3 for the first cell 1 and the MOSFET 3 for the second cell 1 are turned on to start driving the discharge circuits. Then, the second cell 1 reaches 3 V earlier than the first cell 1 because the original voltage of the second cell 1 is lower than that of the first cell 1 by 1 V.

When the second cell 1 reaches 3 V, the assembled battery controller 4 turns off the MOSFET 3 for the second cell 1, and the MOSFET 3 for the first cell 1 remains in the on state and continues to discharge the first cell 1. Next, when the first cell 1 reaches 3 V, the assembled battery controller 4 turns off the MOSFET 3 for the first cell 1, and the driving of all the discharge circuits is stopped.

Note that, the above-mentioned discharge circuit driving request is output from a voltage adjustment section provided in the ECU. Based on the voltages of the respective cells 1 of the assembled battery, the voltage adjustment section determines a discharge circuit driving target cell voltage (target cell voltage) for reducing a voltage variation among the respective cells 1 of the assembled battery, and determines a cell 1 to be discharged. The voltage adjustment section drives a discharge circuit for the cell 1 to be discharged in accordance with the discharge circuit driving target cell voltage.

Further, the ECU is provided with a malfunction diagnosis section configured to compare a discharge circuit pre-driving voltage and a discharge circuit post-driving voltage of the cell 1 to be discharged, to thereby diagnose a malfunction of the discharge circuit corresponding to the cell 1 to be discharged. The detailed function of the malfunction diagnosis section is described later. Note that, the voltage adjustment section and the malfunction diagnosis section may be provided in the assembled battery controller 4.

Referring to the flowcharts of FIG. 2 to FIG. 10, an operation of the power supply system applied with the discharge circuit malfunction diagnosis device according to the first embodiment of the present invention is now described.

Figure 2:
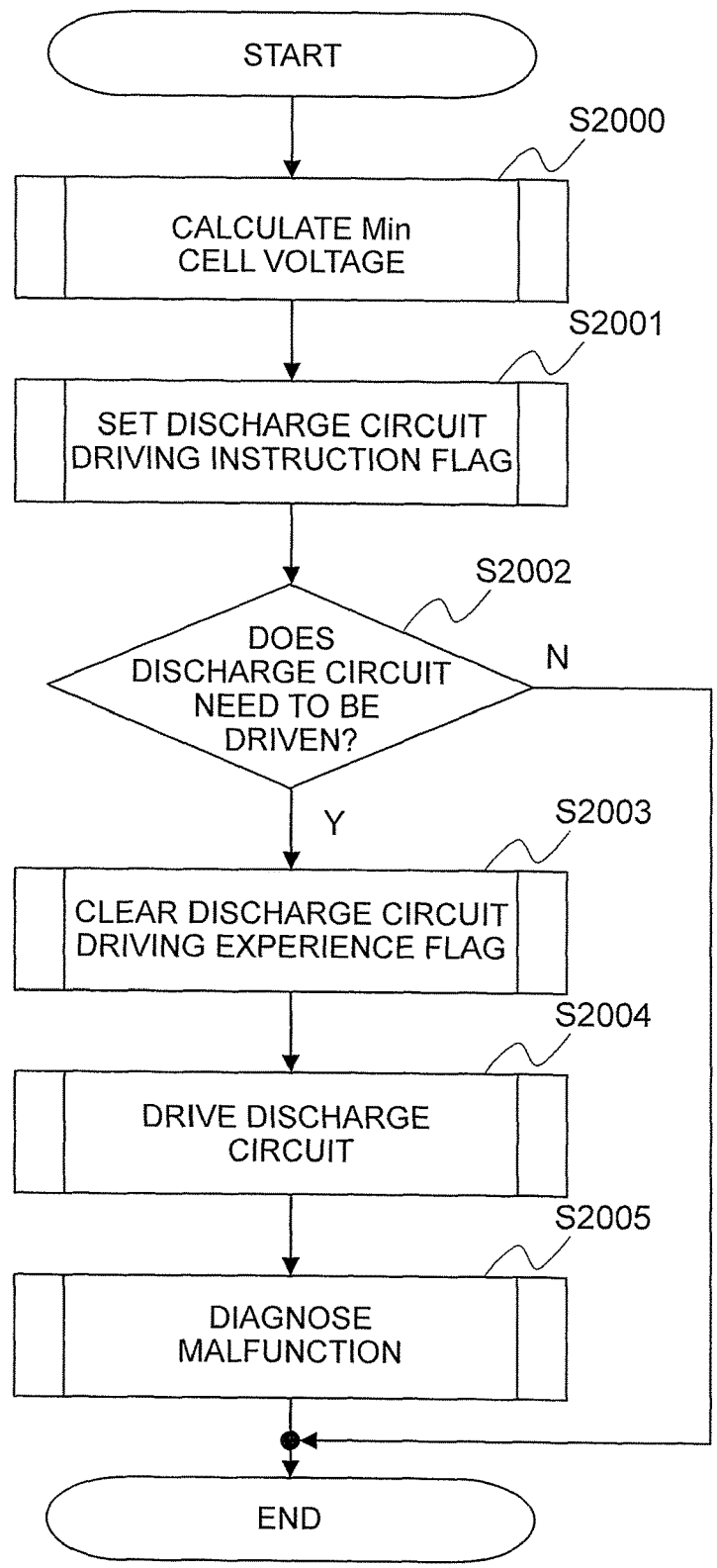
FIG. 2 is a flowchart for illustrating overall processing of the power supply system applied with the discharge circuit malfunction diagnosis device according to the first embodiment of the present invention.

FIG. 2 is a flowchart for illustrating overall processing of the power supply system applied with the discharge circuit malfunction diagnosis device according to the first embodiment of the present invention. The processing of FIG. 2 is executed, for example, when a discharge circuit is driven upon switching-off of the ignition. Note that, details of each processing illustrated in FIG. 2 are described later.

First, "Min cell voltage calculation" processing for determining a Min cell voltage and holding a discharge circuit pre-driving voltage for each cell is invoked (Step S2000).

Subsequently, "discharge circuit driving instruction flag setting" processing for setting a discharge circuit driving instruction flag for each cell is invoked (Step S2001).

Next, it is determined whether or not the discharge circuit needs to be driven (Step S2002). In this case, the necessity to drive the discharge circuit is determined based on the discharge circuit driving instruction flag set in Step S2001.

In Step S2002, when at least one discharge circuit driving instruction flag is set to ON, it is determined that the discharge circuit needs to be driven (that is, Yes), and the flow proceeds to Step S2003.

On the other hand, in Step S2002, when all the discharge circuit driving instruction flags are OFF, it is determined that no discharge circuits need to be driven (that is, No), and the processing of FIG. 2 ends without any further step.

Subsequently, "discharge circuit driving experience flag clearing" processing for clearing a discharge circuit driving experience flag for each cell is invoked (Step S2003).

Next, "discharge circuit driving" processing for driving the discharge circuit for each cell is invoked (Step S2004).

Subsequently, "malfunction diagnosis" processing for diagnosing a malfunction for each cell is invoked (Step S2005), and the processing of FIG. 2 ends.

Figure 3:
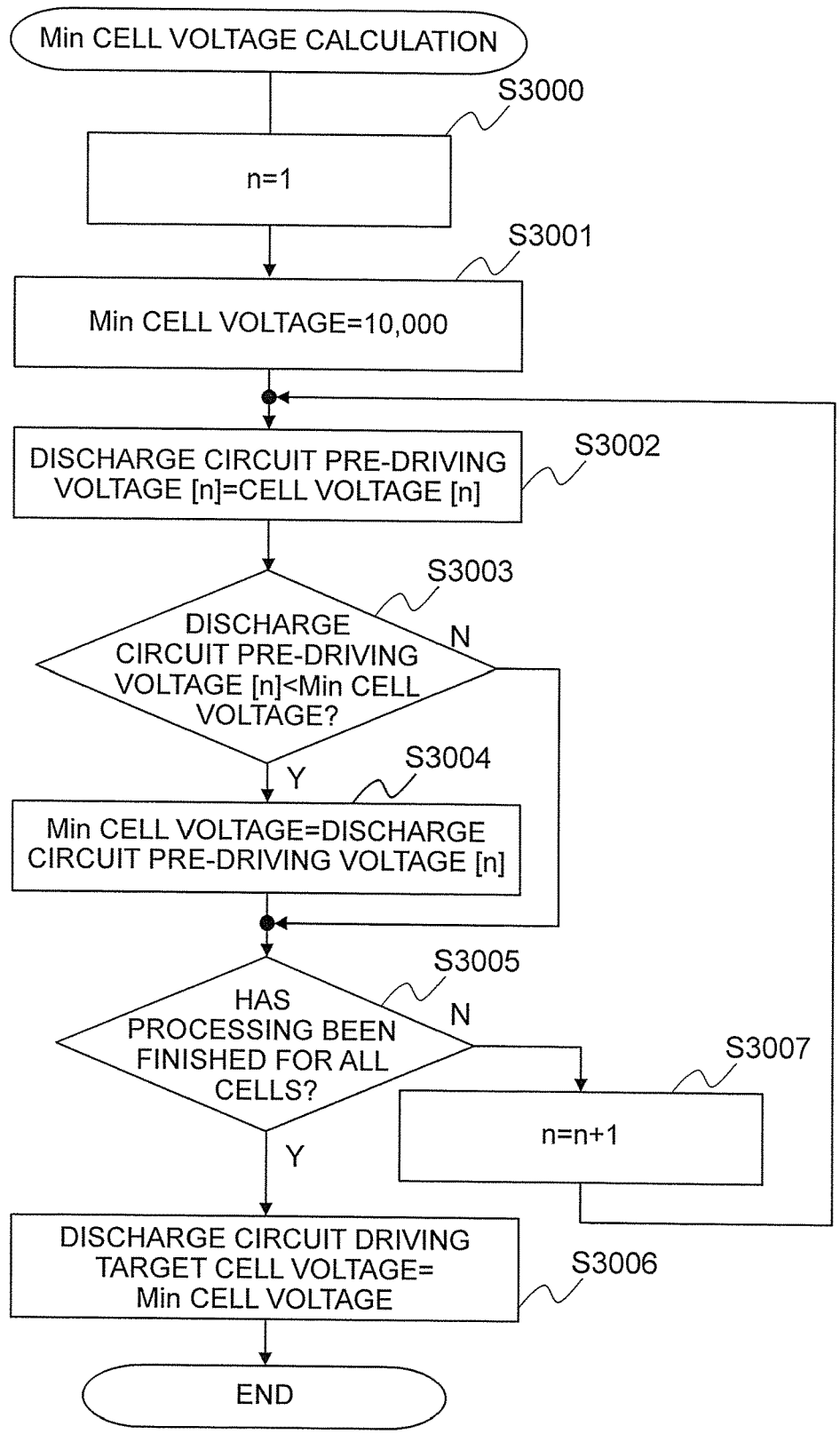
FIG. 3 is a flowchart for illustrating Min cell voltage calculation processing to be executed by a voltage adjustment section according to the first embodiment of the present invention.

FIG. 3 is a flowchart for illustrating the Min cell voltage calculation processing to be executed by the voltage adjustment section according to the first embodiment of the present invention. The processing of FIG. 3 involves calculating a Min cell voltage among all the cells, setting a discharge circuit driving target cell voltage, and storing a discharge circuit pre-driving voltage [n] for each cell.

First, a cell index n is initialized (Step S3000).

Subsequently, an inconceivably large value, for example, 10,000 V, is set as an initial value of the Min cell voltage (Step S3001).

Next, a cell voltage [n] of each cell is held as the discharge circuit pre-driving voltage [n] for each cell (Step S3002). Note that, the discharge circuit pre-driving voltage [n] is referenced in discharge circuit driving instruction flag setting processing, first malfunction diagnosis processing, and second malfunction diagnosis processing to be described later.

Subsequently, it is determined whether or not the discharge circuit pre-driving voltage [n] is smaller than the Min cell voltage (Step S3003).

When it is determined in Step S3003 that the discharge circuit pre-driving voltage [n] is smaller than the Min cell voltage (that is, Yes), the Min cell voltage is updated with the discharge circuit pre-driving voltage [n] (Step S3004), and the flow proceeds to Step S3005.

On the other hand, when it is determined in Step S3003 that the discharge circuit pre-driving voltage [n] is equal to or larger than the Min cell voltage (that is, No), the flow directly proceeds to Step S3005.

Next, it is determined whether or not the processing has been finished for all the cells (Step S3005). In this case, whether or not the processing has been finished for all the cells is determined based on whether or not the cell index n has reached a maximum cell number given in advance.

When it is determined in Step S3005 that the processing has been finished for all the cells (that is, Yes), the final Min cell voltage is stored as the discharge circuit driving target cell voltage (Step S3006), and the processing of FIG. 3 ends.

On the other hand, when it is determined in Step S3005 that the processing has not been finished for all the cells (that is, No), the cell index n is updated to the next index subject to the processing (Step S3007), and the flow returns to Step S3002.

Note that, in FIG. 3, the Min cell voltage is calculated among all the cells, but the present invention is not limited thereto. All the cells may be divided into a plurality of blocks, and a Min cell voltage may be calculated for a certain block. Then, the calculated Min cell voltage may be regarded as a Min cell voltage among all the cells.

Figure 4:
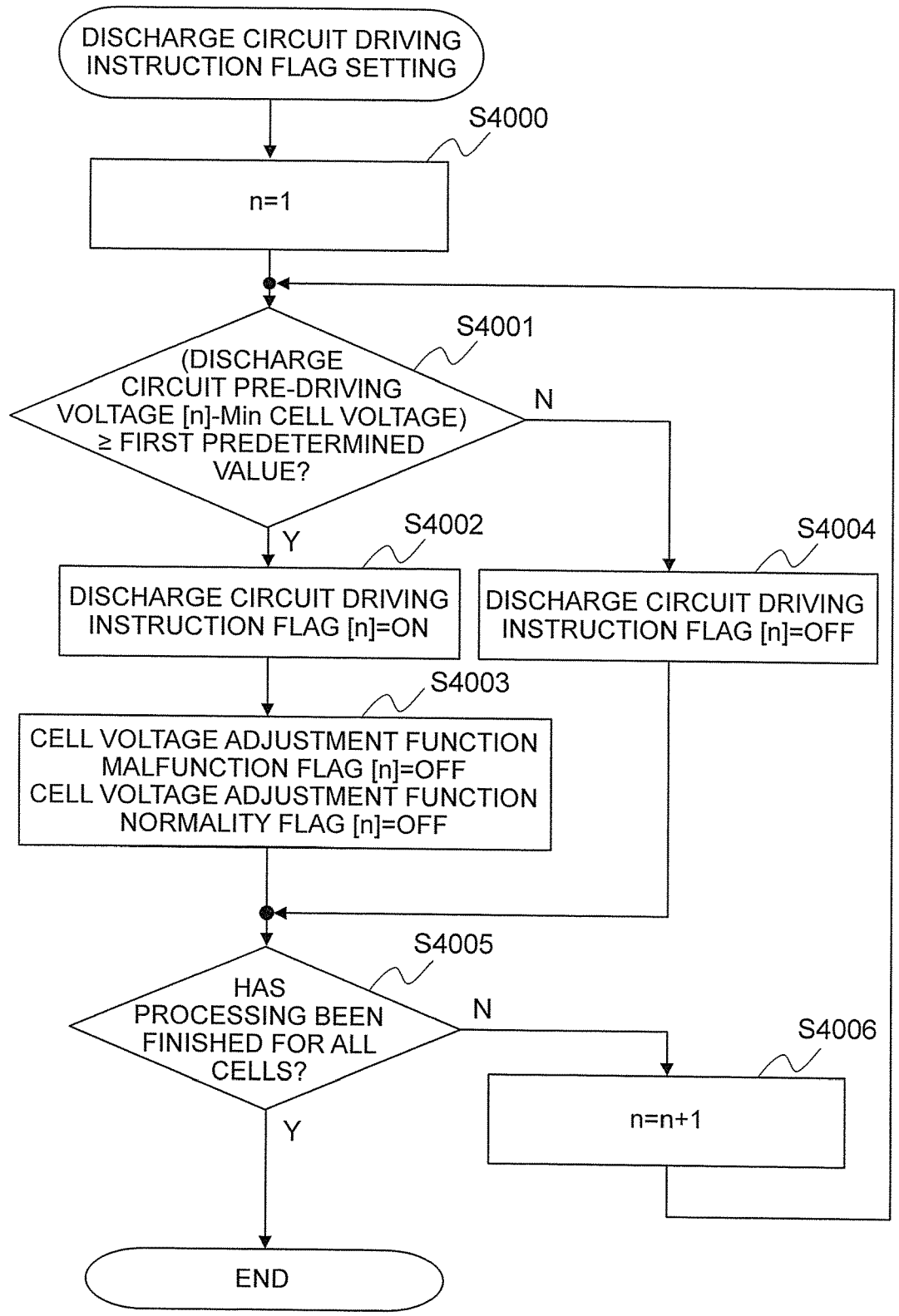
FIG. 4 is a flowchart for illustrating discharge circuit driving instruction flag setting processing to be executed by the voltage adjustment section according to the first embodiment of the present invention.

FIG. 4 is a flowchart for illustrating the discharge circuit driving instruction flag setting processing to be executed by the voltage adjustment section according to the first embodiment of the present invention. The processing of FIG. 4 is processing of setting a discharge circuit driving instruction flag [n] to ON when a difference between the discharge circuit pre-driving voltage [n] for each cell and the Min cell voltage is equal to or larger than a first predetermined value, and setting the discharge circuit driving instruction flag [n] to OFF when the difference is smaller than the first predetermined value.

First, the cell index n is initialized (Step S4000).

Subsequently, it is determined whether or not the difference between the discharge circuit pre-driving voltage [n] and the Min cell voltage is equal to or larger than the first predetermined value (Step S4001). In this case, the first predetermined value is arbitrarily set within the range where a variation from the Min cell voltage is permissible.

When it is determined in Step S4001 that the difference between the discharge circuit pre-driving voltage [n] and the Min cell voltage is equal to or larger than the first predetermined value (that is, Yes), the discharge circuit driving instruction flag [n] is set to ON (Step S4002).

Next, a cell voltage adjustment function malfunction flag [n] is set to OFF and a cell voltage adjustment function normality flag [n] is set to OFF (Step S4003), and the flow proceeds to Step S4005. In this case, the cell voltage adjustment function malfunction flag is a flag indicating a malfunction of the discharge circuit, and the cell voltage adjustment function malfunction flag and the cell voltage adjustment function normality flag are set to OFF at the time of initialization.

On the other hand, when it is determined in Step S4001 that the difference between the discharge circuit pre-driving voltage [n] and the Min cell voltage is smaller than the first predetermined value (that is, No), the discharge circuit driving instruction flag [n] is set to OFF (Step S4004). The cell voltage adjustment function malfunction flag [n] and the cell voltage adjustment function normality flag [n] hold the previous values, and the flow proceeds to Step S4005.

Subsequently, it is determined whether or not the processing has been finished for all the cells (Step S4005). In this case, whether or not the processing has been finished for all the cells is determined based on whether or not the cell index n has reached a maximum cell number given in advance.

When it is determined in Step S4005 that the processing has been finished for all the cells (that is, Yes), the processing of FIG. 4 ends without any further step.

On the other hand, when it is determined in Step S4005 that the processing has not been finished for all the cells (that is, No), the cell index n is updated to the next index subject to the processing (Step S4006), and the flow returns to Step S4001.

Figure 5:
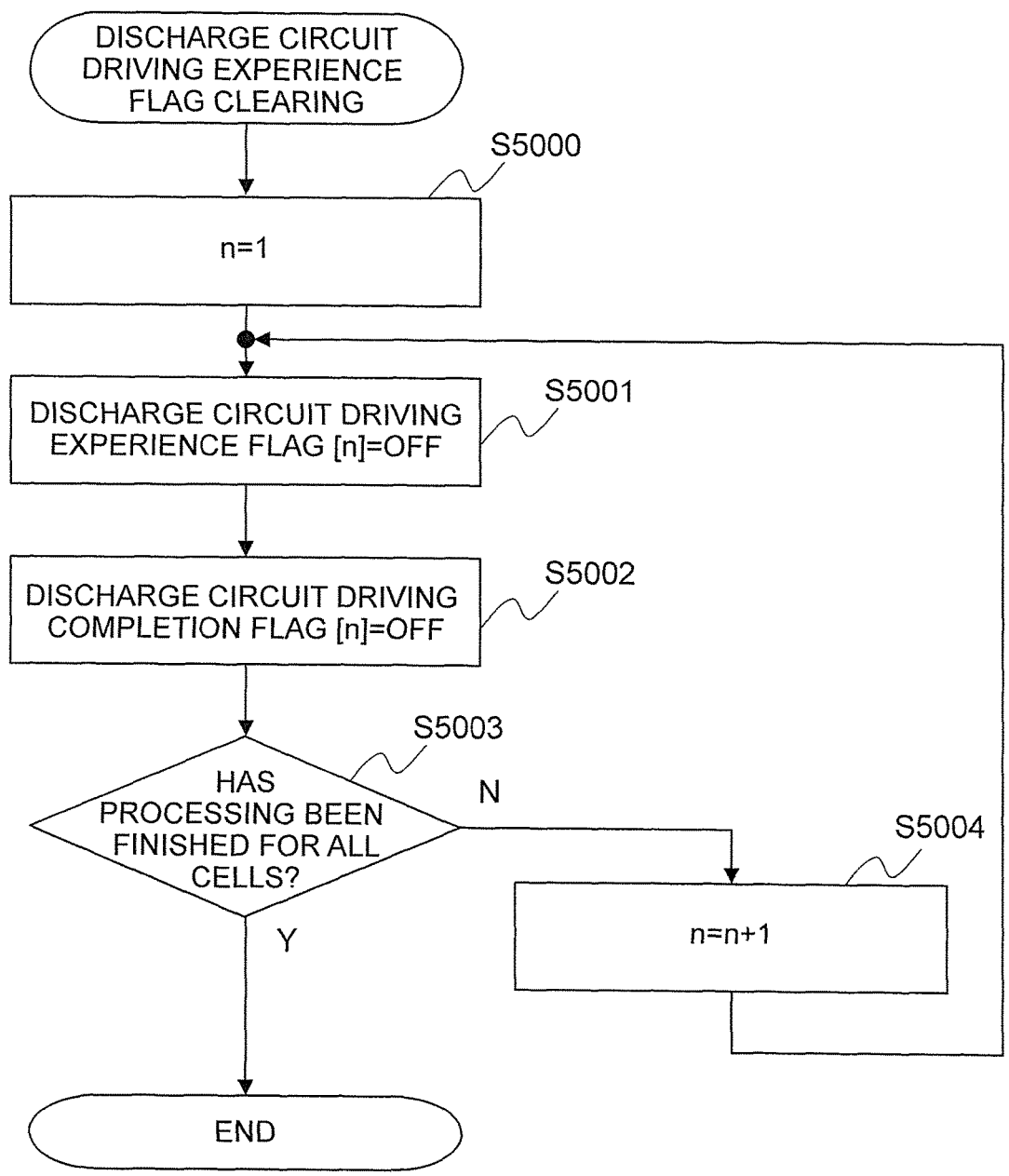
FIG. 5 is a flowchart for illustrating discharge circuit driving experience flag clearing processing to be executed by the voltage adjustment section according to the first embodiment of the present invention.

FIG. 5 is a flowchart for illustrating the discharge circuit driving experience flag clearing processing to be executed by the voltage adjustment section according to the first embodiment of the present invention. The processing of FIG. 5 is processing of clearing the discharge circuit driving experience flags for all the cells.

First, the cell index n is initialized (Step S5000).

Subsequently, the discharge circuit driving experience flag [n] is set to OFF (Step S5001).

Next, a discharge circuit driving completion flag [n] is set to OFF (Step S5002).

Subsequently, it is determined whether or not the processing has been finished for all the cells (Step S5003). In this case, whether or not the processing has been finished for all the cells is determined based on whether or not the cell index n has reached a maximum cell number given in advance.

When it is determined in Step S5003 that the processing has been finished for all the cells (that is, Yes), the processing of FIG. 5 ends without any further step.

On the other hand, when it is determined in Step S5003 that the processing has not been finished for all the cells (that is, No), the cell index n is updated to the next index subject to the processing (Step S5004), and the flow returns to Step S5001.

Figure 6:
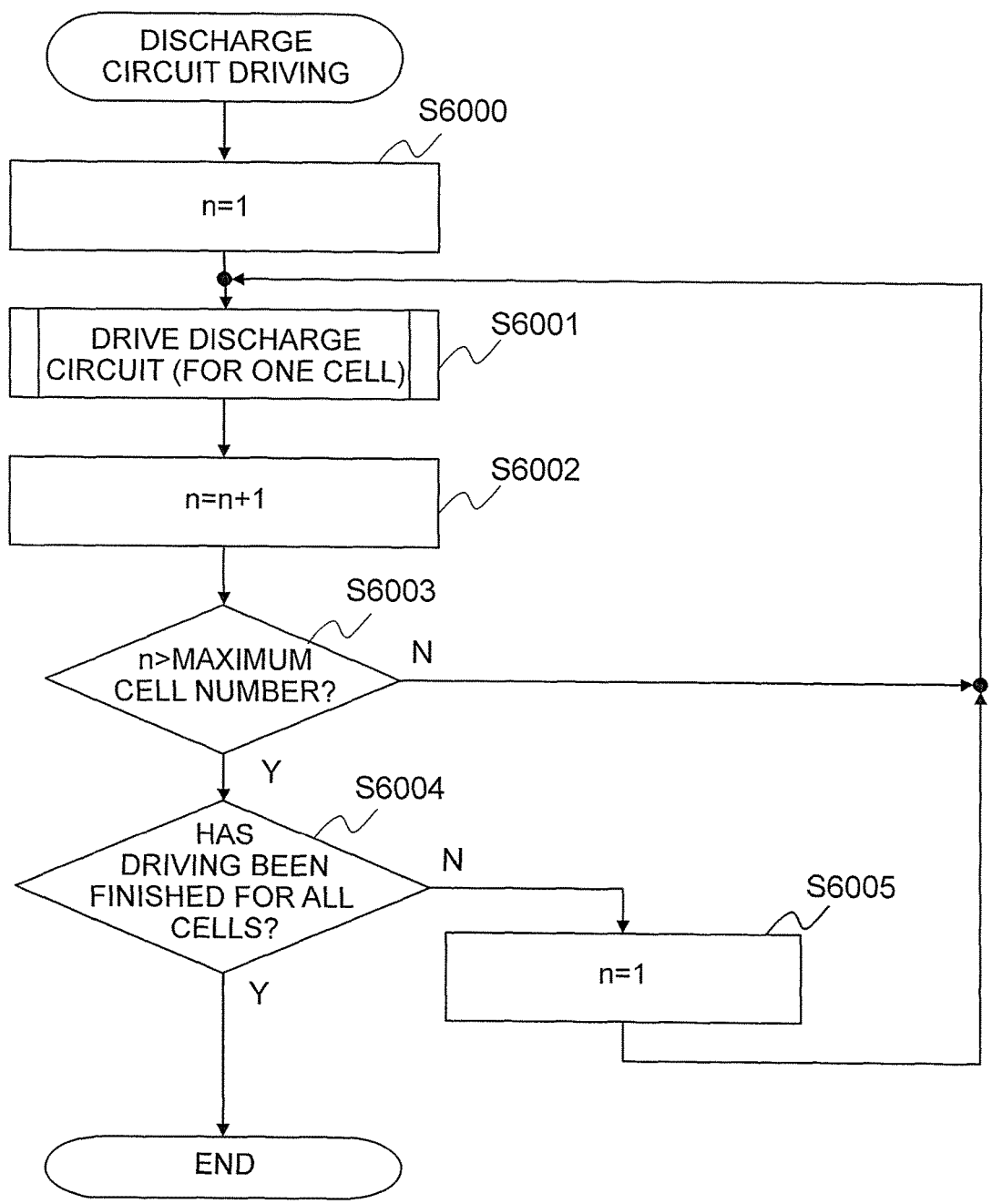
FIG. 6 is a flowchart for illustrating discharge circuit driving processing to be executed by the voltage adjustment section according to the first embodiment of the present invention.

FIG. 6 is a flowchart for illustrating the discharge circuit driving processing to be executed by the voltage adjustment section according to the first embodiment of the present invention. The processing of FIG. 6 is processing of invoking the discharge circuit driving processing for all the cells. Whether or not to drive the discharge circuit is determined in the discharge circuit driving processing.

First, the cell index n is initialized (Step S6000).

Subsequently, the discharge circuit driving processing for one cell is invoked (Step S6001). Details of the discharge circuit driving processing for one cell are described later.

Next, the cell index n is updated to the next index subject to the processing (Step S6002), and it is determined whether or not the cell index n is larger than a maximum cell number (Step S6003).

When it is determined in Step S6003 that the cell index n is equal to or smaller than the maximum cell number (that is, No), the flow returns to Step S6001 immediately.

On the other hand, when it is determined in Step S6003 that the cell index n is larger than the maximum cell number (that is, Yes), it is determined whether or not the driving of the discharge circuits for all the cells has been finished (Step S6004). In this case, whether or not the driving of the discharge circuits for all the cells has been finished is determined based on whether or not the discharge circuit driving completion flag [n] for each discharge circuit is ON.

When it is determined in Step S6004 that the driving of the discharge circuits for all the cells has been finished (that is, Yes), the processing of FIG. 6 ends without any further step.

On the other hand, when it is determined in Step S6004 that the driving of the discharge circuits for all the cells has not been finished (that is, No), the cell index n is initialized (Step S6005), and the flow returns to Step S6001.

Figure 7:
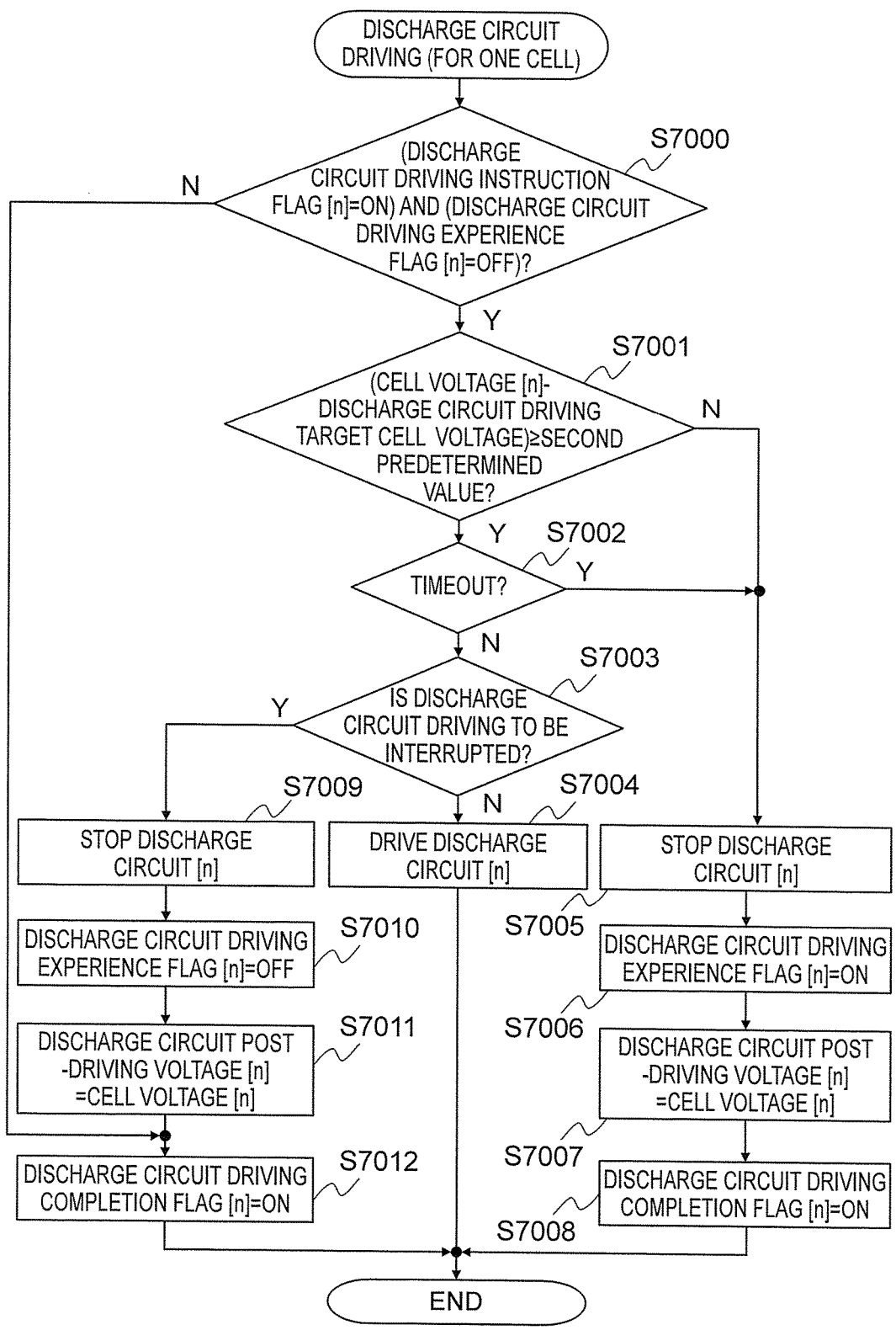
FIG. 7 is a flowchart for illustrating the discharge circuit driving processing for one cell to be executed by the voltage adjustment section according to the first embodiment of the present invention.

FIG. 7 is a flowchart for illustrating the discharge circuit driving processing for one cell to be executed by the voltage adjustment section according to the first embodiment of the present invention. The processing of FIG. 7 is processing of driving the discharge circuit in units of cells based on the discharge circuit driving instruction flag, the discharge circuit driving experience flag, the cell voltage, the discharge circuit driving target cell voltage, a timeout, and a discharge circuit driving interruption.

First, it is determined whether or not the discharge circuit driving instruction flag [n] is ON and the discharge circuit driving experience flag [n] is OFF (Step S7000).

When it is determined in Step S7000 that the discharge circuit driving instruction flag [n] is ON and the discharge circuit driving experience flag [n] is OFF (that is, Yes), it is determined whether or not a difference between the current cell voltage [n] and the discharge circuit driving target cell voltage is equal to or larger than a second predetermined value (Step S7001). In this case, the second predetermined value is arbitrarily set within the range smaller than the above-mentioned first predetermined value.

When it is determined in Step S7001 that the difference between the current cell voltage [n] and the discharge circuit driving target cell voltage is equal to or larger than the second predetermined value (that is, Yes), it is determined whether or not a timeout of the discharge circuit driving has been detected (whether or not a timeout period has elapsed) (Step S7002).

In this case, an example of the timeout period is a period of time necessary for a cell voltage of a cell having the largest difference from the discharge circuit driving target cell voltage to sufficiently drop to the discharge circuit driving target cell voltage by the discharge circuit driving. Note that, the occurrence of the timeout indicates that the discharge circuit may have failed and the cell voltage may not decrease.

When it is determined in Step S7002 that the timeout has not been detected (that is, No), it is determined whether or not a request to interrupt the discharge circuit driving has been issued (Step S7003).

In this case, one conceivable example of the discharge circuit driving interruption request in the case where the discharge circuit is driven at the time of turning off the ignition is that another task detects that a discharge circuit driving condition is no longer satisfied because the ignition is turned on again after the ignition is turned off, and a discharge circuit driving interruption request is then issued.

When it is determined in Step S7003 that the discharge circuit driving interruption request has not been issued (that is, No), the target discharge circuit is driven (Step S7004), and the processing of FIG. 7 ends. Note that, when the target discharge circuit is already driven, the discharge circuit continues to be driven.

On the other hand, when it is determined in Step S7001 that the difference between the current cell voltage [n] and the discharge circuit driving target cell voltage is smaller than the second predetermined value (that is, No) or when it is determined in Step S7002 that a timeout has been detected (that is, Yes), the driving of the target discharge circuit is stopped (Step S7005).

Subsequently, the discharge circuit driving experience flag [n] is set to ON (Step S7006), the current cell voltage [n] is stored as the discharge circuit post-driving voltage [n] (Step S7007), the discharge circuit driving completion flag [n] is set to ON (Step S7008), and the processing of FIG. 7 ends.

On the other hand, when it is determined in Step S7003 that the discharge circuit driving interruption request has been issued (that is, Yes), the driving of the target discharge circuit is stopped (Step S7009).

Next, the discharge circuit driving experience flag [n] is set to OFF (Step S7010), the current cell voltage [n] is stored as the discharge circuit post-driving voltage [n] (Step S7011), the discharge circuit driving completion flag [n] is set to ON (Step S7012), and the processing of FIG. 7 ends.

On the other hand, when it is determined in Step S7000 that the discharge circuit driving instruction flag [n] is OFF or the discharge circuit driving experience flag [n] is ON (that is, No), the flow proceeds to Step S7012.

Note that, the case where the discharge circuit driving instruction flag [n] is OFF or the discharge circuit driving experience flag [n] is ON in Step S7000 includes a case where the discharge circuit driving instruction flag [n] is ON and the processing of Steps S7005 to S7008 is executed, and after the discharge circuit driving experience flag [n] is set to ON, the processing of FIG. 7 is entered again.

Figure 8:
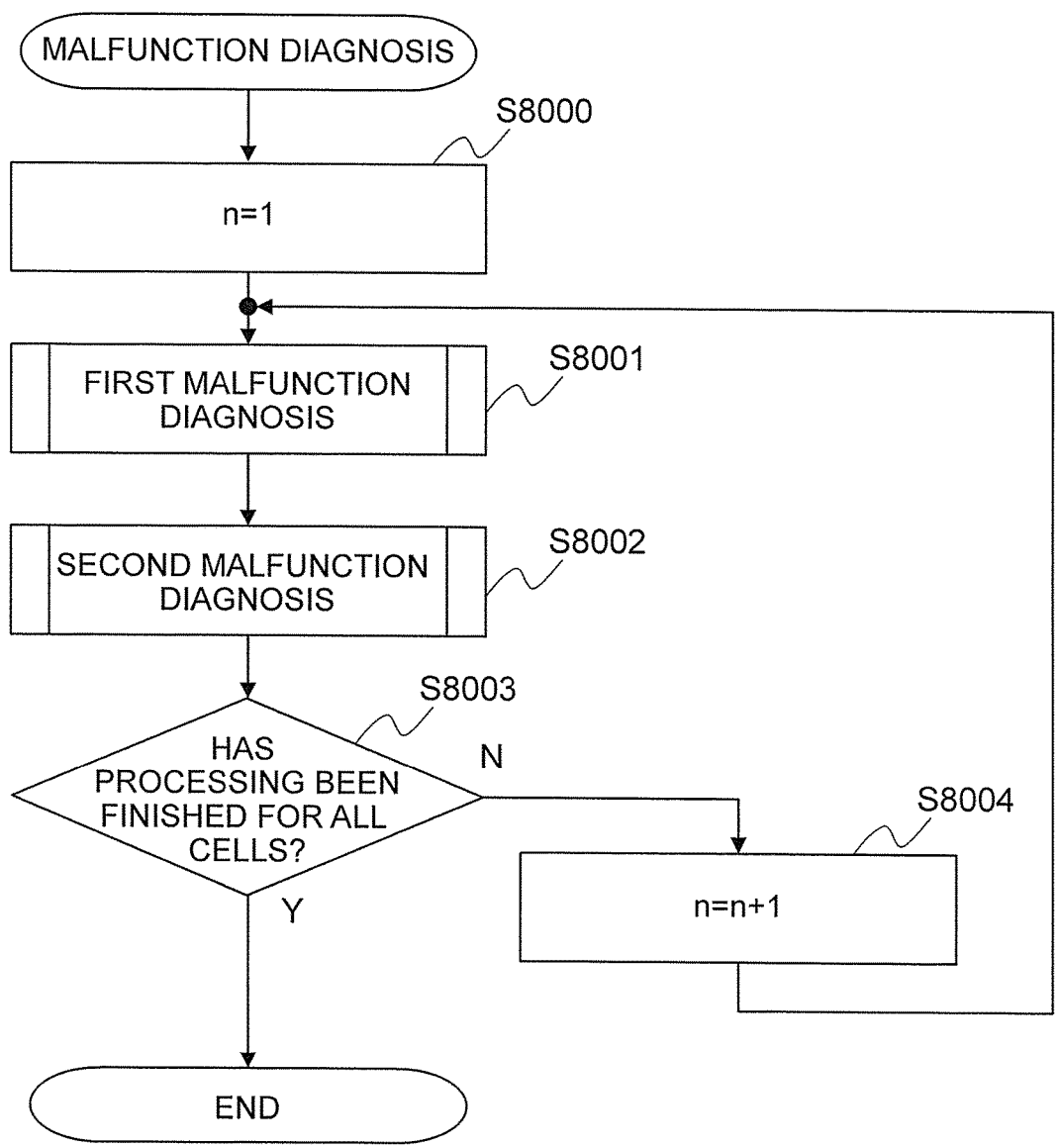
FIG. 8 is a flowchart for illustrating malfunction diagnosis processing to be executed by a malfunction diagnosis section according to the first embodiment of the present invention.

FIG. 8 is a flowchart for illustrating the malfunction diagnosis processing to be executed by the malfunction diagnosis section according to the first embodiment of the present invention. The processing of FIG. 8 is processing of invoking the first malfunction diagnosis processing and the second malfunction diagnosis processing in units of cells.

First, the cell index n is initialized (Step S8000).

Subsequently, the first malfunction diagnosis processing is invoked to execute a malfunction determination and a normality determination (Step S8001). Details of the first malfunction diagnosis processing are described later.

Next, the second malfunction diagnosis processing is invoked to execute a normality determination (Step S8002). Details of the second malfunction diagnosis processing are described later.

Subsequently, it is determined whether or not the processing has been finished for all the cells (Step S8003). In this case, whether or not the processing has been finished for all the cells is determined based on whether or not the cell index n has reached a maximum cell number given in advance.

When it is determined in Step S8003 that the processing has been finished for all the cells (that is, Yes), the processing of FIG. 8 ends without any further step.

On the other hand, when it is determined in Step S8003 that the processing has not been finished for all the cells (that is, No), the cell index n is updated to the next index subject to the processing (Step S8004), and the flow returns to Step S8001.

Figure 9:
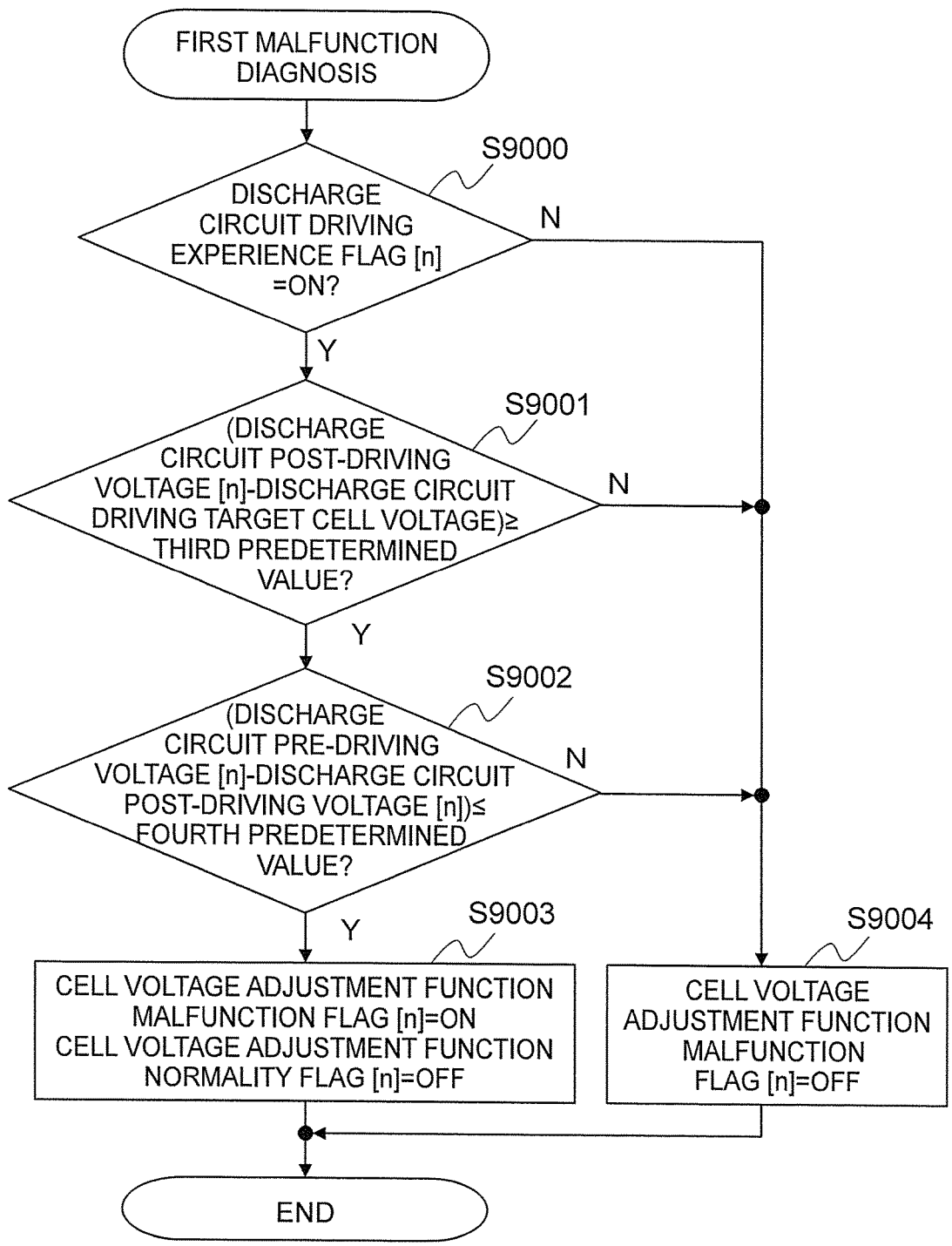
FIG. 9 is a flowchart for illustrating first malfunction diagnosis processing to be executed by the malfunction diagnosis section according to the first embodiment of the present invention.

FIG. 9 is a flowchart for illustrating the first malfunction diagnosis processing to be executed by the malfunction diagnosis section according to the first embodiment of the present invention. The processing of FIG. 9 executes the first malfunction diagnosis processing in units of cells based on the discharge circuit driving experience flag, the discharge circuit post-driving voltage, the discharge circuit driving target cell voltage, and the discharge circuit pre-driving voltage.

First, it is determined whether or not the discharge circuit driving experience flag [n] is ON (Step S9000).

When it is determined in Step S9000 that the discharge circuit driving experience flag [n] is ON (that is, Yes), it is determined whether or not a difference between the discharge circuit post-driving voltage [n] and the discharge circuit driving target cell voltage is equal to or larger than a third predetermined value (Step S9001). In this case, the third predetermined value is arbitrarily set between the above-mentioned first predetermined value and the above-mentioned second predetermined value, but it is desired that the third predetermined value be a value larger than the second predetermined value in consideration of a voltage drop amount of the discharge circuit.

When it is determined in Step S9001 that the difference between the discharge circuit post-driving voltage [n] and the discharge circuit driving target cell voltage is equal to or larger than the third predetermined value (that is, Yes), it is determined whether or not a difference between the discharge circuit pre-driving voltage [n] and the discharge circuit post-driving voltage [n] is equal to or less than a fourth predetermined value (Step S9002). In this case, the fourth predetermined value is arbitrarily set within the range of from 0 to (first predetermined value-third predetermined value).

When it is determined in Step S9002 that the difference between the discharge circuit pre-driving voltage [n] and the discharge circuit post-driving voltage [n] is equal to or smaller than the fourth predetermined value (that is, Yes), the cell voltage adjustment function malfunction flag [n] is set to ON and the cell voltage adjustment function normality flag [n] is set to OFF to determine that the discharge circuit has failed (Step S9003). Then, the processing of FIG. 9 ends.

On the other hand, when it is determined in Step S9000 that the discharge circuit driving experience flag [n] is OFF (that is, No), when it is determined in Step S9001 that the difference between the discharge circuit post-driving voltage [n] and the discharge circuit driving target cell voltage is smaller than the third predetermined value (that is, No), or when it is determined in Step S9002 that the difference between the discharge circuit pre-driving voltage [n] and the discharge circuit post-driving voltage [n] is larger than the fourth predetermined value, the cell voltage adjustment function malfunction flag [n] is set to OFF to determine that the discharge circuit is normal (Step S9004). Then, the processing of FIG. 9 ends.

Figure 10:
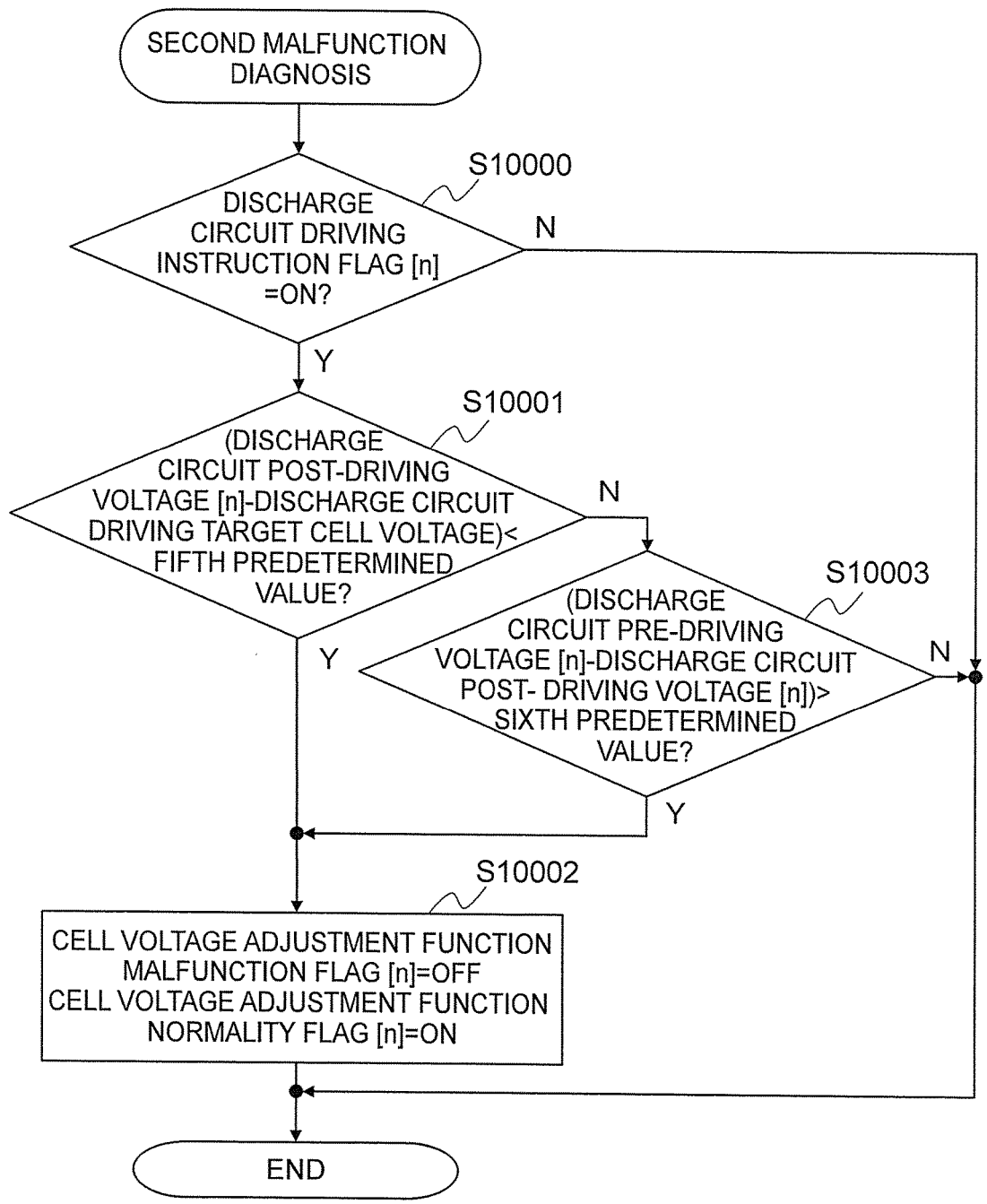
FIG. 10 is a flowchart for illustrating second malfunction diagnosis processing to be executed by the malfunction diagnosis section according to the first embodiment of the present invention.

FIG. 10 is a flowchart for illustrating the second malfunction diagnosis processing to be executed by the malfunction diagnosis section according to the first embodiment of the present invention. The processing of FIG. 10 executes the second malfunction diagnosis processing in units of cells based on the discharge circuit driving instruction flag, the discharge circuit post-driving voltage, the discharge circuit driving target cell voltage, and the discharge circuit pre-driving voltage.

Specifically, the processing of FIG. 10 is aimed at determining, for a cell whose cell voltage has failed to drop to a discharge circuit driving target cell voltage until a supposed timeout period even after the driving of the discharge circuit, that the discharge circuit is normal when a difference between the discharge circuit driving target cell voltage and the cell voltage falls within the range where the discharge circuit can be determined to have sufficiently functioned.

First, it is determined whether or not the discharge circuit driving instruction flag [n] is ON (Step S10000).

When it is determined in Step S10000 that the discharge circuit driving instruction flag [n] is ON (that is, Yes), it is determined whether or not a difference between the discharge circuit post-driving voltage [n] and the discharge circuit driving target cell voltage is smaller than a fifth predetermined value (Step S10001). In this case, the fifth predetermined value may be the same as the above-mentioned second predetermined value, but it is desired that the fifth predetermined value be a value larger than the second predetermined value in consideration of a voltage drop amount of the discharge circuit.

When it is determined in Step S10001 that the difference between the discharge circuit post-driving voltage [n] and the discharge circuit driving target cell voltage is smaller than the fifth predetermined value (that is, Yes), the cell voltage adjustment function malfunction flag [n] is set to OFF and the cell voltage adjustment function normality flag [n] is set to ON to determine that the discharge circuit is normal (Step S10002). Then, the processing of FIG. 10 ends.

On the other hand, when it is determined in Step S10001 that the difference between the discharge circuit post-driving voltage [n] and the discharge circuit driving target cell voltage is equal to or larger than the fifth predetermined value (that is, No), it is determined whether or not a difference between the discharge circuit pre-driving voltage [n] and the discharge circuit post-driving voltage [n] is larger than a sixth predetermined value (Step S10003). In this case, the sixth predetermined value may be the same as the above-mentioned fourth predetermined value, but is arbitrarily set within the range of from 0 to (first predetermined value-third predetermined value).

When it is determined in Step S10003 that the difference between the discharge circuit pre-driving voltage [n] and the discharge circuit post-driving voltage [n] is larger than the sixth predetermined value (that is, Yes), it is determined that the discharge circuit has sufficiently functioned, and the flow proceeds to Step S10002 to determine that the discharge circuit is normal.

On the other hand, when it is determined in Step S10000 that the discharge circuit driving instruction flag [n] is OFF (that is, No) or when it is determined in Step S10003 that the difference between the discharge circuit pre-driving voltage [n] and the discharge circuit post-driving voltage [n] is equal to or smaller than the sixth predetermined value (that is, No), the processing of FIG. 10 ends without any further step. In this case, neither the malfunction determination nor the normality determination is executed, and the previous determination result is held.

As described above, according to the first embodiment, the malfunction diagnosis section compares a discharge circuit pre-driving voltage and a discharge circuit post-driving voltage of a cell to be discharged, to thereby diagnose a malfunction of a discharge circuit corresponding to the cell to be discharged.

With this, a malfunction is diagnosed for a cell for which a discharge circuit is driven, and hence an erroneous malfunction determination due to a small difference between the discharge circuit pre-driving voltage and the discharge circuit post-driving voltage is not caused. Further, an existing discharge circuit can be used without providing any special circuit.

Consequently, the discharge circuit malfunction diagnosis device and the discharge circuit malfunction diagnosis method that are capable of preventing an erroneous malfunction determination and require no increase in cost can be obtained.

Further, the voltage adjustment section stops the discharge of the cell when the voltage of the cell to be discharged reaches the target cell voltage or when the discharge circuit is driven for a predetermined period.

The malfunction diagnosis section determines that there is a malfunction in a discharge circuit corresponding to a cell to be discharged when a difference between a discharge circuit post-driving voltage of the cell to be discharged and a target cell voltage is equal to or larger than a predetermined value (third predetermined value) and when a difference between a discharge circuit pre-driving voltage and the discharge circuit post-driving voltage of the cell to be discharged is equal to or smaller than a predetermined value (fourth predetermined value).

The malfunction diagnosis section determines that the discharge circuit corresponding to the cell to be discharged is normal when the difference between the discharge circuit post-driving voltage of the cell to be discharged and the target cell voltage is smaller than a predetermined value (fifth predetermined value) and when the difference between the discharge circuit pre-driving voltage and the discharge circuit post-driving voltage of the cell to be discharged is larger than a predetermined value (sixth predetermined value).

Consequently, even when the voltage of the cell to be discharged does not reach the target cell voltage and the driving of the discharge circuit is finished after a predetermined period (timeout period) has elapsed, the malfunction determination and the normality determination on the discharge circuit can be executed.

Further, the malfunction diagnosis section executes at least one of the malfunction determination or the normality determination on the discharge circuit for each driving of the discharge circuit.

For comparison, in the related-art assembled battery discharge device disclosed in Patent Literature 1, it is necessary to restrict (prohibit) the charge and discharge of the assembled battery in order to make a malfunction diagnosis, and hence there is a problem in that processing on the prohibited side as well as the malfunction diagnosis processing is complicated. Further, there is another problem in that although for a short period of time, the discharge circuit needs to be driven for a malfunction diagnosis to consume electric power.

In the first embodiment, on the other hand, the malfunction diagnosis section executes a malfunction determination or a normality determination for each driving of the discharge circuit, and hence it is not necessary to restrict the execution of other processing in order to make a malfunction diagnosis, and the processing is not complicated. Further, the discharge circuit is not driven solely for the purpose of the malfunction diagnosis, and hence wasteful discharge power consumption is avoided.

Note that, in the above description in the first embodiment, the malfunction diagnosis section diagnoses a malfunction of a discharge circuit corresponding to a cell to be discharged based on a cell voltage of the cell to be discharged, but the present invention is not limited thereto. The malfunction diagnosis section may diagnose a malfunction of the discharge circuit corresponding to the cell to be discharged based on a cell state of charge (SOC) of the cell to be discharged.

Also in this case, the same effects as those in the above-mentioned first embodiment can be obtained.

The invention claimed is:

1. A discharge circuit malfunction diagnosis device configured to diagnose a malfunction of a discharge circuit, which is to be applied to a power supply system,
    the power supply system comprising:
        an assembled battery comprising a plurality of cells;
        a discharge circuit, which is provided correspondingly to each of the plurality of cells, and which is configured to discharge the each of the plurality of cells when driven; and
        a voltage adjustment section configured to determine, based on voltages of the respective plurality of cells of the assembled battery, a target cell voltage for reducing a voltage variation among the respective plurality of cells of the assembled battery, and a cell to be discharged, and configured to drive a discharge circuit for the cell to be discharged in accordance with the target cell voltage,
    wherein the discharge circuit malfunction diagnosis device comprising a malfunction diagnosis section configured to compare a discharge circuit pre-driving voltage and a discharge circuit post-driving voltage of the cell to be discharged, to thereby diagnose a malfunction of a discharge circuit corresponding to the cell to be discharged, and
    wherein the target cell voltage is set based on a minimum cell voltage determined among all of the plurality of cells.

2. The discharge circuit malfunction diagnosis device according to claim 1,
    wherein the voltage adjustment section is configured to stop discharge of the cell to be discharged when a voltage of the cell to be discharged reaches the target cell voltage or when the discharge circuit is driven for a predetermined period of time, and
    wherein the malfunction diagnosis section is configured to determine that there is a malfunction in the discharge circuit corresponding to the cell to be discharged when a difference between a discharge circuit post-driving voltage of the cell to be discharged and the target cell voltage is equal to or larger than a predetermined value and when a difference between a discharge circuit pre-driving voltage and the discharge circuit post-driving voltage of the cell to be discharged is equal to or smaller than a predetermined value.

3. The discharge circuit malfunction diagnosis device according to claim 2,
    wherein the voltage adjustment section is configured to stop discharge of the cell to be discharged when a voltage of the cell to be discharged reaches the target cell voltage or when the discharge circuit is driven for a predetermined period of time, and
    wherein the malfunction diagnosis section is configured to determine that the discharge circuit corresponding to the cell to be discharged is normal when a difference between a discharge circuit post-driving voltage of the cell to be discharged and the target cell voltage is smaller than a predetermined value and when a difference between a discharge circuit pre-driving voltage and the discharge circuit post-driving voltage of the cell to be discharged is larger than a predetermined value.

4. The discharge circuit malfunction diagnosis device according to claim 3, wherein the malfunction diagnosis section is configured to execute at least one of a malfunction determination and a normality determination on the discharge circuit for each driving of the discharge circuit.

5. The discharge circuit malfunction diagnosis device according to claim 2, wherein the malfunction diagnosis section is configured to execute at least one of a malfunction determination and a normality determination on the discharge circuit for each driving of the discharge circuit.

6. The discharge circuit malfunction diagnosis device according to claim 1,
    wherein the voltage adjustment section is configured to stop discharge of the cell to be discharged when a voltage of the cell to be discharged reaches the target cell voltage or when the discharge circuit is driven for a predetermined period of time, and
    wherein the malfunction diagnosis section is configured to determine that the discharge circuit corresponding to the cell to be discharged is normal when a difference between a discharge circuit post-driving voltage of the cell to be discharged and the target cell voltage is smaller than a predetermined value and when a difference between a discharge circuit pre-driving voltage and the discharge circuit post-driving voltage of the cell to be discharged is larger than a predetermined value.

7. The discharge circuit malfunction diagnosis device according to claim 6, wherein the malfunction diagnosis section is configured to execute at least one of a malfunction determination and a normality determination on the discharge circuit for each driving of the discharge circuit.

8. The discharge circuit malfunction diagnosis device according to claim 1, wherein the malfunction diagnosis section is configured to execute at least one of a malfunction determination and a normality determination on the discharge circuit for each driving of the discharge circuit.

9. A discharge circuit malfunction diagnosis method for diagnosing a malfunction of a discharge circuit, which is to be applied to a power supply system,
    the power supply system comprising:
        an assembled battery comprising a plurality of cells;

a discharge circuit, which is provided correspondingly to each of the plurality of cells, and which is configured to discharge the each of the plurality of cells when driven; and a voltage adjustment section configured to determine, based on voltages of the respective plurality of cells of the assembled battery, a target cell voltage for reducing a voltage variation among the respective plurality of cells of the assembled battery, and a cell to be discharged, and configured to drive a discharge circuit for the cell to be discharged in accordance with the target cell voltage, wherein the discharge circuit malfunction diagnosis method comprising a malfunction diagnosis step of comparing a discharge circuit pre-driving voltage and a discharge circuit post-driving voltage of the cell to be discharged, to thereby diagnose a malfunction of a discharge circuit corresponding to the cell to be discharged, and wherein the target cell voltage is set based on a minimum cell voltage determined among all of the plurality of cells.

* * * * *